United States Patent [19]

Krage

[11] 4,045,797

[45] Aug. 30, 1977

[54] RADAR DOPPLER FREQUENCY MEASURING APPARATUS

[75] Inventor: Mark K. Krage, Romeo, Mich.

[73] Assignee: General Motors Corporation, Detroit, Mich.

[21] Appl. No.: 637,934

[22] Filed: Dec. 5, 1975

[51] Int. Cl.² .............................................. G01S 9/44
[52] U.S. Cl. ...................................... 343/8; 343/7 A
[58] Field of Search ................................... 343/8, 7 A

[56] References Cited

U.S. PATENT DOCUMENTS

| 3,233,084 | 2/1966 | Kendall et al. | 343/8 |
| 3,478,356 | 11/1969 | Divine | 343/8 |
| 3,706,096 | 12/1972 | Hammack | 343/8 |
| 3,838,424 | 9/1974 | Goldfischer | 343/8 |
| 3,860,924 | 1/1975 | Evans | 343/7 A |

OTHER PUBLICATIONS

MacLeod, A portable High-Resolution Counter for Low Frequency Measurements, Hewlett Packard Journal, Nov. 1973, pp. 10-15.

Primary Examiner—Brooks H. Hunt
Attorney, Agent, or Firm—H. N. Conkey

[57] ABSTRACT

A radar doppler frequency measuring system is described which times the duration between zero level cross-over of a selected number of doppler cycles. Errors due to spurious zero level cross-overs of the doppler signal due to noise is minimized by a circuit which imposes a time delay after the detection of a zero cross-over before the detection of the next zero cross-over. The time delay is made proportional to the period of the doppler signal to enable the system to operate over a wide doppler frequency bandwidth.

2 Claims, 4 Drawing Figures

RADAR DOPPLER FREQUENCY MEASURING APPARATUS

This invention is directed toward a system for measuring the doppler frequency in a radar system.

The frequency of a signal can be measured directly by counting the number of cycles in a given interval of time or by measuring the time interval of a period of the waveform and taking the reciprocal of this value. In doppler radar applications, one doppler cycle corresponds to a change in path length from the transmitter to an obstacle and back to the receiver of one wave length of the transmitted radiation. Therefore, under ideal circumstances, an accuracy of ±1% in the measurement of the doppler frequency requires that the doppler cycle counting procedure must observe at least 50 doppler cycles, or a change in path length of 50 wave lengths, in a given time interval. With the period measuring technique, however, the measurement can be performed over only one-half doppler cycle and the accuracy will depend only on the accuracy on the technique used to measure the time interval of the half period. One technique for the measurement of this time is that of counting the number of pulses from a high frequency clock over the time interval and the error is on the order of ±1 divided by the clock frequency. Since the clock frequency can be made very large compared to the doppler frequency, the time measurement can be made negligibly small. The period measurement technique can therefore measure the doppler frequency over very small changes in path length and has definite advantages in radar system applications where the doppler frequency must be determined in a short range interval and in a minimum amount of time.

In applying the period measurement technique, the period of the signal is usually delineated by the detection of zero crossings of the signal. However, noise due to electronic sources and fluctuations due to clutter and other sources can induce spurious zero crossings and cause fluctuations in the period of the signal. Assuming that the spurious zero crossings can be eliminated, the inaccuracies caused by period variations can be minimized by averaging over a suitable number of cycles. One method of reducing the number of spurious zero crossings due to noise is to impose a fixed time delay after the detection of a zero crossing before the detection of the next zero crossing can take place. For reasonably large signal-to-noise ratios, all noise induced zero crossings will occur in the vicinity of the true zero crossing. Therefore, the time delay, if it is sufficiently large, will permit the detection of only one zero crossing in the vicinity of a true signal zero crossing. The success of the fixed time delay technique is limited by the frequency range of the signals to be encountered. For example, a delay which is comparable to a quarter cycle at the highest frequency of interest is only a small fraction of a cycle at the lowest frequency of interest if the frequency range is large. As a result, the noise immunity at the lower frequencies will be degraded. For example, in radar applications, the doppler bandwidths can be on the order of 1,000 to 1. In view of this, it is the general object of this invention to provide for an improved radar doppler frequency measurement device which has noise immunity over a wide doppler bandwidth.

It is another object of this invention to provide for a radar doppler frequency device having noise immunity whereby a time delay is imposed after the detection of the doppler signal zero crossing before the detection of the next zero crossing can take place wherein the time delay is proportional to the period of the doppler waveform.

These and other objects of the invention may be best understood by reference to the following description of a preferred embodiment and the drawings in which.

Figure 1:
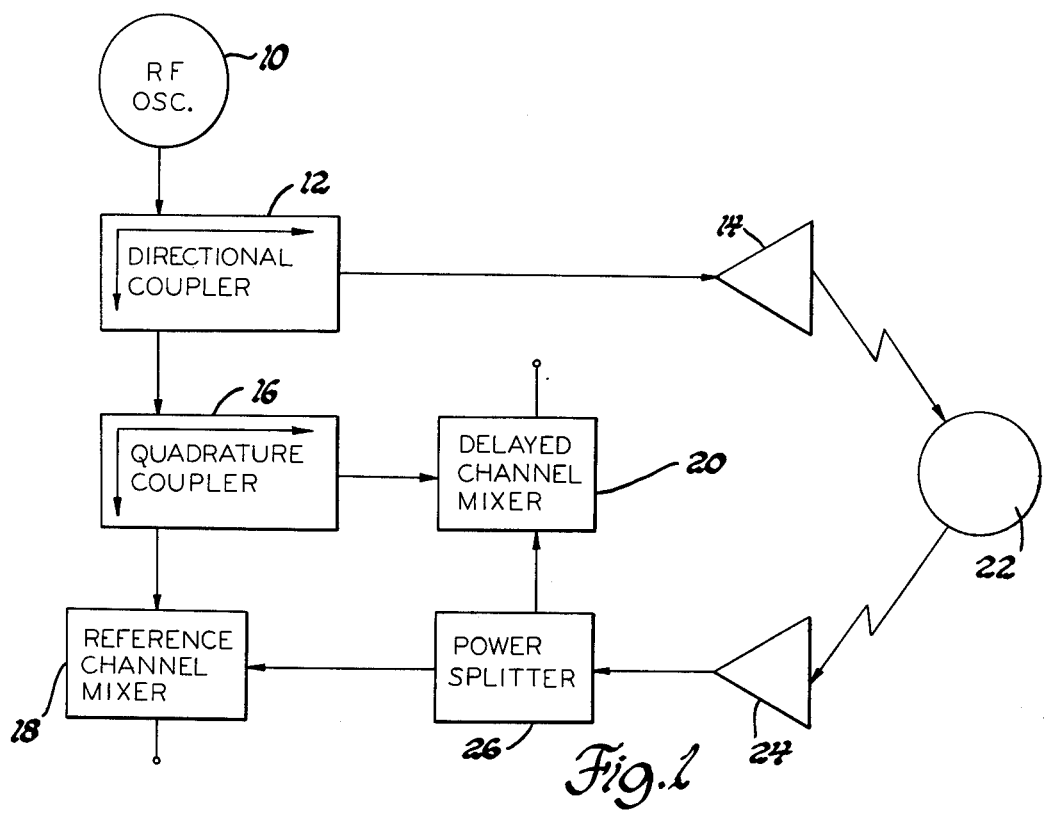
FIG. 1 is a schematic of a doppler frequency processing unit used in the preferred embodiment of this invention.

Referring to FIG 1, and rf oscillator 10 generates an rf signal which is coupled to a directional coupler 12 which feeds a portion of the generated rf signal to a transmitting antenna 14 and a portion of the generated rf signal to a quadrature coupler 16. The quadrature coupler 16 divides the rf signal supplied thereto from the directional coupler 12 equally between a delayed channel mixer 20 and a reference channel mixer 18 and delays the rf signal to the delayed channel mixer 20 by an angle of 90° with respect to the rf signal supplied to the reference mixer 18.

Assuming an object 22 is irradiated by the transmitted rf signal, a portion of the rf signal is reflected from the object and is detected by a receiving antenna 24. The frequency of the detected rf signal is shifted from the frequency of the transmitted rf signal by an amount determined by the relative velocity between the radar system and the object 22. The frequency shifted detected rf signal is coupled by the receiving antenna 24 to a power splitter 26 which couples equal portions of the rf signal received to the reference channel mixer 18 and to the delayed channel mixer 20.

The reference channel mixer 18 sums the rf signal inputs thereto from the quadrature coupler 16 and the power splitter 26 and supplies a reference channel doppler signal defined by the expression $K \cos W_d t$ where $K$ is a constant, $W_d$ is is the radian doppler frequency and $t$ is time. The delayed channel mixer 20 sums the rf signals supplied thereto from the quadrature coupler 16 and the power splitter 26 and supplies a delayed channel doppler signal defined by the expression $K \cos (W_d t + \pi/2)$ for increasing range and $K \cos (W_d t - \pi/2)$ for decreasing range. As can be seen from the foregoing expressions, the delayed channel doppler signal output of the delayed channel mixer 20 leads or lags the doppler signal outout of the reference channel mixer 18 by 90°.

Figure 2:
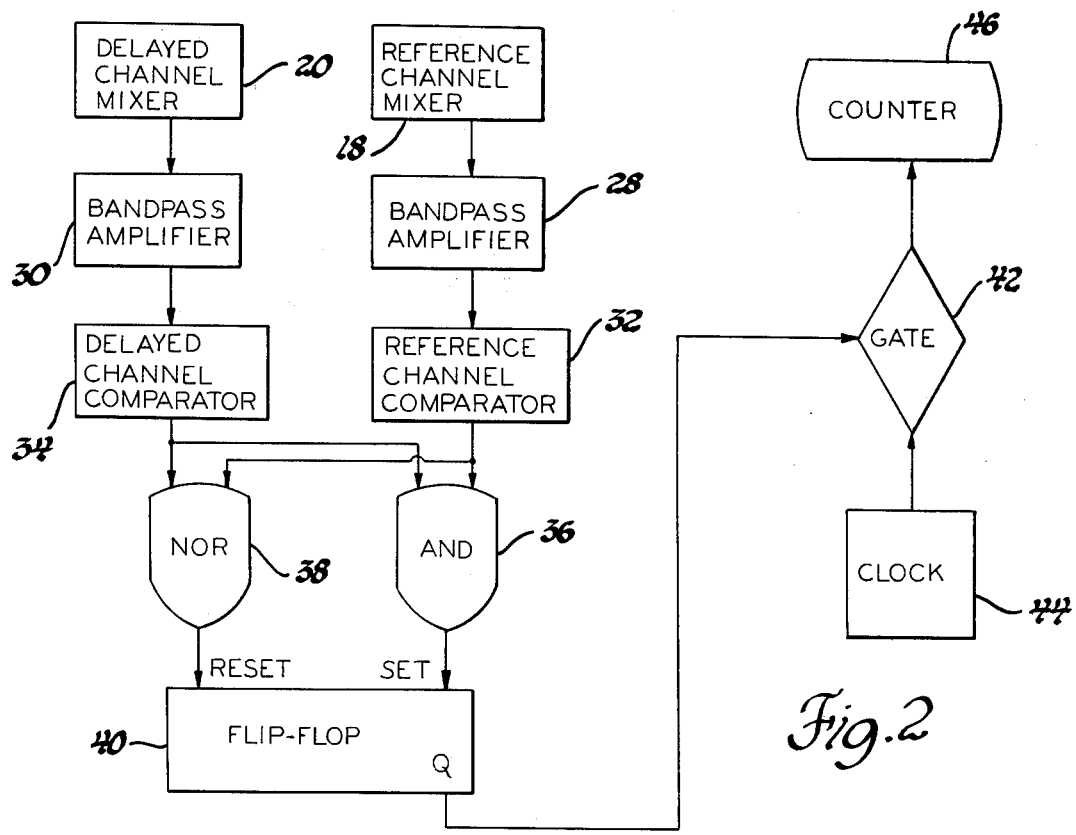
FIG. 2 is a schematic diagram of a signal processor for generating an indication of the frequency of the doppler signals.

Referring to FIG. 2, the output of the reference channel mixer 18 is coupler to a bandpass amplifier 28 which supplies a reference channel doppler voltage signal at the frequency of the doppler shift. The output of the delayed channel mixer 20 is coupled to a bandpass amplifier 30 which supplies a delayed channel doppler voltage signal having a frequency equal to the doppler frequency shift. The delayed channel doppler voltage signal form the bandpass amplifier 30 is shifted from the reference channel doppler voltage signal from the bandpass amplifier 28 by an angle of 90°.

Figure 3:
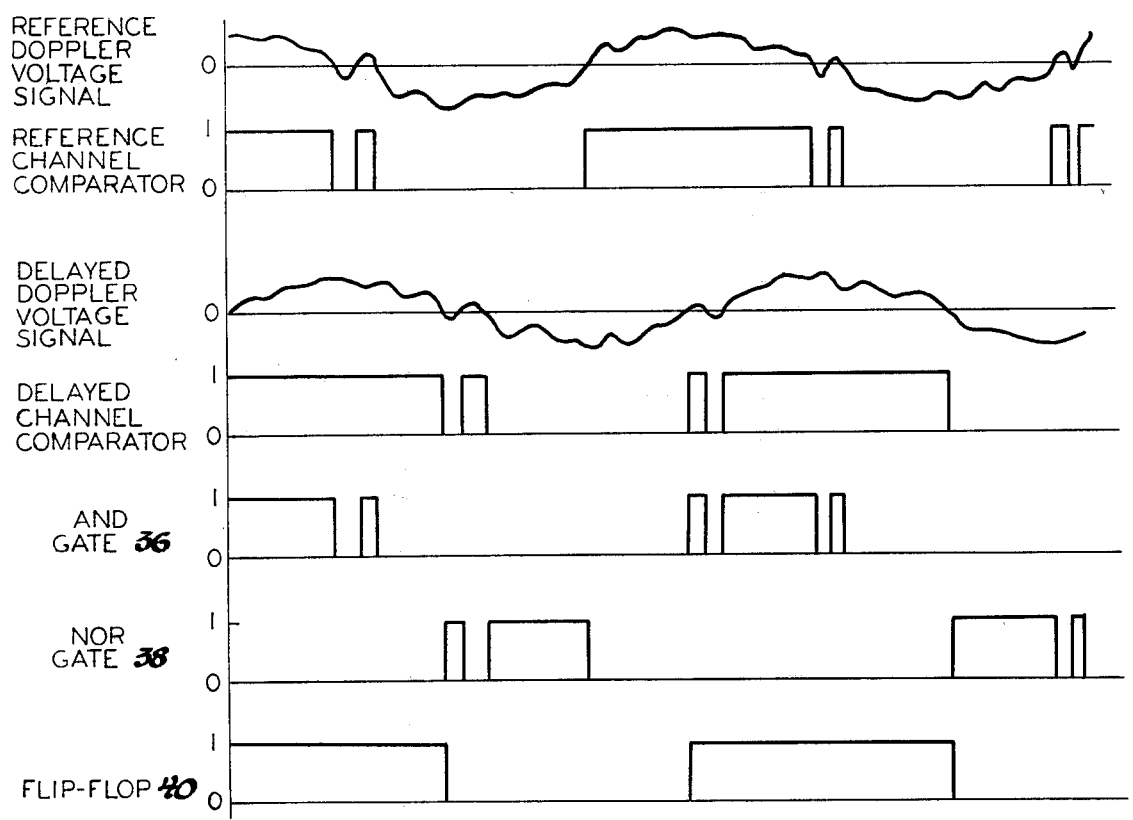
FIG. 3 is a timing diagram illustrating the operation of the system of FIGS. 1 and 2 for the case of decreasing range between an obstacle and the radar system.
Figure 4:
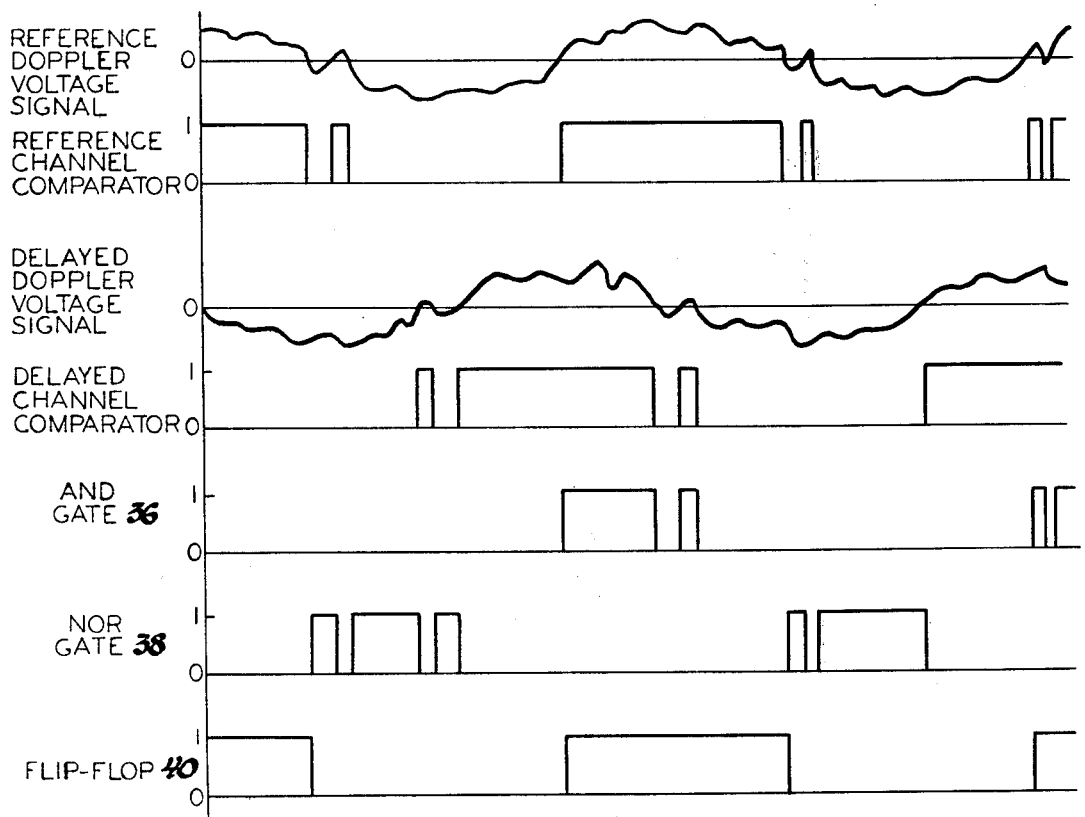
FIG. 4 is a timing diagram illustrating the operation of the system of FIGS. 1 and 2 for the case of increasing range between an obstacle and the radar system.

The zero level cross-overs of the outputs of the bandpass amplifiers 28 and 30 are used to delineate the period of the doppler waveforms. This is accomplished by a reference channel comparator 32 which is coupled to the output of the bandpass amplifier 28 and a delayed channel comparator 34 which is coupled to the output of the bandpass amplifier 30. Each of the comparators 32 and 34 functions to generate a digital logic 1 output for positive levels of the respective doppler voltage signals and a digital logic 0 output for negative values of the respective doppler voltage signals. The reference and delayed channel doppler voltage signal outputs of the bandpass amplifiers 28 and 30 and the resulting outputs of the comparators 30 and 34 are illustrated in FIG. 3 for the case of decreasing range between the radar system and the obstacle 22 and in FIG. 4 for the case of increasing range between the obstacle 22 and the radar system. As can be seen in FIGS. 3 and 4, noise signals on the doppler voltage signal outputs of the comparators 32 and 34 result in spurious zero crossovers of the respective doppler voltage signals and which are reflected in the outputs of the comparators 32 and 34.

Assuming that the period of the doppler voltage signal is to be measured between successive zero crossings, the occurrance of two noise induced zero crossings is the vicinity of the true signal zero crossings will give a very short and grossly incorrect period measurement and can either shorten or lengthen the time to the next zero crossing. In order to suppress the excess noise induced zero crossings, the subject circuit uses the information supplied by the delayed channel comparator 34 to impose a time delay after the detection of a zero crossing by the reference channel comparator 32.

Due to the quadrature nature of the reference and delayed doppler voltage signals, which is independent of the doppler frequency the two signal zero crossings of the reference and delayed doppler voltage signals will occur alternately in time. In the subject system, this condition is enforces by requiring that the detection of a zero crossing of the reference doppler voltage signal before an additional zero crossing of the delayed doppler voltage signal can be detected, and vice versa. In this manner, all but the first zero crossing in the vicinity of a true zero crossing are ignored. This is accomplished by coupling the output of the reference channel comparator 32 to one input of an AND gate 36 and to one input of a NOR gate 38 and by coupling the output of the delayed channel comparator 34 to a second input of the AND gate and to a second input of the NOR gate 38. The output of the AND gate 36 is coupled to the set input of an edge triggered flip-flop 40 and the output of the NOR gate 38 is coupled to the reset input of the flip-flop 40. The Q output of the flip-flop 40 is coupled to the enable input of the gate 42 which has a clock signal supplied thereto from a high frequency clock 44. When the Q output of the flip-flop 40 is a digital logic 1, the gate 42 is enabled to couple the clock signals from the clock 44 to a counter 46.

The AND gate 36 is of the conventional variety wherein the output thereof is set to a digital logic 1 when the inputs thereto are all at digital logic 1's and the NOR gate 38 is of the conventional variety wherein the output thereof is set to a digital logic 1 when both inputs thereto are all logic O's.

With reference to FIGS. 2 and 3, in the case of decreasing range between the obstacle and the radar system, the AND gate 36 detects the first positive going zero crossing of the delayed channel doppler voltage signal in the vicinity of true zero, given that the reference channel doppler signal is positive, and sets the Q output of the flip-flop 40 to a digital logic 1. The NOR gate 38 detects the first negative going zero crossing of the delayed channel doppler voltage signal, given that the reference doppler signal is negative in the vicinity of true zero implying that the reference channel went through a zero crossing, and resets the Q output of the flip-flop 40 to a digital logic zero. The logic 1 and logic 0 durations of the flip-flop 40 then correspond to half the period of the doppler signal and either one can be used to enable the gate 42 for the duration of one-half period. In the embodiment illustrated in FIG. 2, the Q output of the flip-flop 40 is used to enable the gate 42 to couple the clock signals from the clock 44 to the counter 46 which counts the clock pulses for the duration of one-half of the doppler signal. If one complete period is to be measured, a toggle flip-flop can be inserted between the Q output of the flip-flop 40 and the gate 42. Further averaging could be accomplished by inserting a counter between the Q output of the flip-flop 40 and the gate 42 to enable the gate 42 for a specified number of doppler signal cycles. The number of clock pulses counted by the counter 46 while the gate 42 is enabled provides a measurement of the doppler frequency shift.

In the case of increasing range, reference is made to FIG. 4 wherein the roles of the reference and delayed doppler voltage signals are interchanged and the edges of the flip-flop 40 output correspond to the edges of the reference doppler signal. As in the case of the increasing range illustration of FIG. 3, the logic 1 and 0 outputs of the flip-flop 40 correspond to half the period of the doppler signal waveform and provides for the frequency measurement of the doppler signal.

As can be seen from the foregoing, the output of the flip-flop 40 does not respond to the excess zero crossovers of the doppler voltage signals and will provide an indication of the period of the signal substantially affected by noise signals.

In the system described, the detection of a zero crossing of either the reference or delayed doppler voltage signal (depending on whether the range between the radar system and the object is increasing or decreasing) after one such zero crossing is detected, is delayed until the other one of the reference or delayed doppler voltage signal experiences a zero crossing. Since the reference and delayed doppler voltage signals are phase shifted 90° from one another, the delay imposed is approximately 90° and is therefore variable as a function of the doppler frequency.

The description of the preferred embodiment of the invention for the purpose of illustration thereof is not to be considered as limiting or restricting the invention since many modifications may be made by the exercise of skill in the art without departing from the scope of the invention.

It is claimed:

1. A doppler frequency measuring circuit for use with a radar system having an rf generator, a transmitter effective to transmit the rf signal toward an object and a receiver effective to detect the rf signal reflected from the object, the doppler frequency measuring circuit comprising:

A phase shifter coupled to the rf generator and effective to supply a delayed rf signal having a specified delay angle relative to the generated rf signal;

a first mixer effective to mix the generated rf signal and the detected rf signal and supply a first doppler signal;

a second mixer effective to mix the delayed rf signal and the detected rf signal and supply a second doppler signal;

logic means responsive to the first and second doppler signals for detecting zero level cross-overs of one of the first and second doppler signals, the logic means including means for preventing the detection of a zero cross-over of said one of the first or second doppler signals after detection of a zero cross-over thereof until the other one of the first and second doppler signals experiences a zero level cross-over; and means for measuring the time duration between detected zero level cross-overs of said one of the first and second doppler signals, the measured time duration representing the frequency of the first and second doppler signals, whereby the measurement of the frequency of the doppler signals is substantially unaffected by noise signals over a large doppler frequency bandwidth.

2. A doppler frequency measuring circuit for use with a radar system having an rf generator, a transmitter effective to transmit the rf signal toward an object and a receiver effective to detect the rf signal reflected from the object, the doppler frequency measuring circuit comprising:

a phase shifter coupled to the rf generator and effective to supply a delayed rf signal having a specified delay angle relative to the generated rf signal;

a first mixer effective to mix the generated rf signal and the detected rf signal and supply a first doppler signal;

a second mixer effective to mix the delayed rf signal and the detected rf signal and supply a second doppler signal;

a first comparator effective to generate a first digital signal having a transition between first and second states with each zero cross-over of the first doppler signal;

a second comparator effective to generate a second digital signal having a transition between first and second states with each zero cross-over of the second doppler signal;

a bi-stable multivibrator having first and second stable operating states;

a first logic gate responsive to the first and second digital signals and effective to set the bi-stable multivibrator to one of the first and second stable operating states a point in time when a selected one of the states of each of the first and second digital signals exist simultaneously;

a second logic gate responsive to the first and second digital signals and effective to reset the bi-stable multivibrator to the other one of the first and second stable operating states a point when neither of the selected one of the states of each of the first and second digital signals exits;

and timing means effective to measure the time duration of at least one of the stable operating states of the bi-stable multivibrator, the measured time duration representing the frequency of the first and second doppler signals, whereby the measurement of the frequency of the doppler signals is substantially unaffected by noise signals over a large doppler frequency bandwidth.

* * * * *

UNITED STATES PATENT OFFICE
CERTIFICATE OF CORRECTION

Patent No. 4,045,797          Dated August 30, 1977

Inventor(s) Mark K. Krage

It is certified that error appears in the above-identified patent and that said Letters Patent are hereby corrected as shown below:

Column 1, line 40, "fluctuations" should be -- fluctuation --.

Column 2, line 21, "and" should be -- an --; line 56, "outout" should be -- output --; line 59, "coupler" should be -- coupled --; line 66, "form" should be -- from --.

Column 3, line 26, "occurrance" should be -- occurrence --; same line, "is" should be -- in --; line 40, "enforces" should be -- enforced --; line 50, the numeral "36" should be inserted after "gate" (first occurrence).

Column 4, line 66, "A" should be -- a --;

Column 5, line 11, -- level -- should be inserted after "zero".

Column 6, line 26, -- in time -- should be inserted after "point".

Signed and Sealed this

Second Day of May 1978

[SEAL]

Attest:

RUTH C. MASON      LUTRELLE F. PARKER
Attesting Officer     Acting Commissioner of Patents and Trademarks